United States Patent [19]

Ochs et al.

[11] 4,378,892
[45] Apr. 5, 1983

[54] CLOSURE CAP WITH METALLIC INNERSEAL AND SEALED PACKAGE

[75] Inventors: Charles S. Ochs, Lancaster; Carl E. Koontz, Thornville, both of Ohio

[73] Assignee: Anchor Hocking Corporation, Lancaster, Ohio

[21] Appl. No.: 257,749

[22] Filed: Apr. 27, 1981

[51] Int. Cl.³ .............................................. B65D 41/18
[52] U.S. Cl. .................................................. 215/232
[58] Field of Search ......................... 215/232; 156/69

[56] References Cited

U.S. PATENT DOCUMENTS

| 4,044,941 | 8/1977 | Knudsen | 215/232 X |
| 4,109,815 | 8/1978 | Collins | 215/232 |
| 4,260,438 | 4/1981 | Dembicki et al. | 215/232 X |

Primary Examiner—Donald F. Norton
Attorney, Agent, or Firm—Holland, Armstrong, Wilkie & Previto

[57] ABSTRACT

A molded plastic closure is described for particular use on packages employing a metallic innerseal and where the package is sealed using induction heating for softening a heat sensitive adhesive on the under surface of the innerseal while pressure is applied to the cap top. The closure cap is formed of a deformable plastic with a relatively thin shell permitting the induction coils to be positioned close to the metallic innerseal and to permit portions of the closure cap to be wrapped closely around portions of the container finish during the induction sealing process.

13 Claims, 6 Drawing Figures

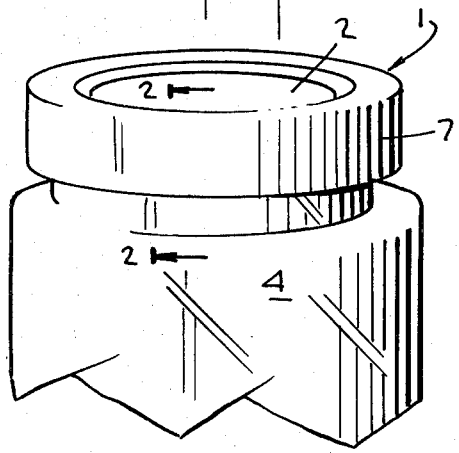
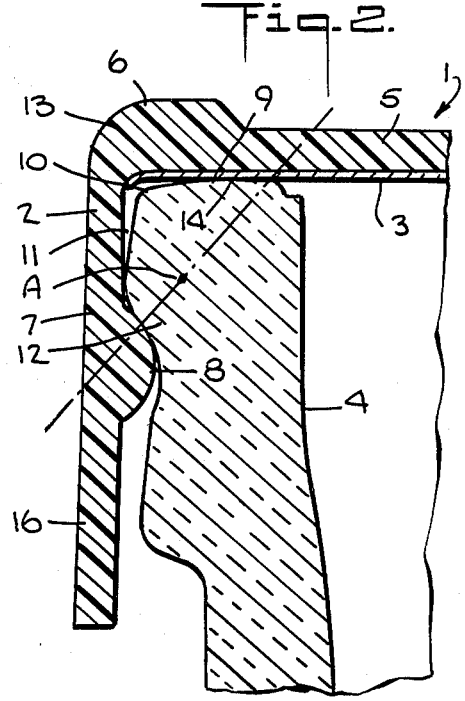
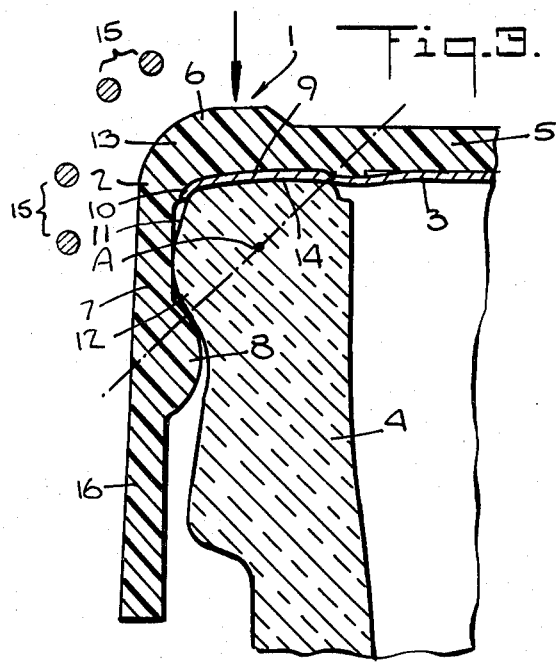
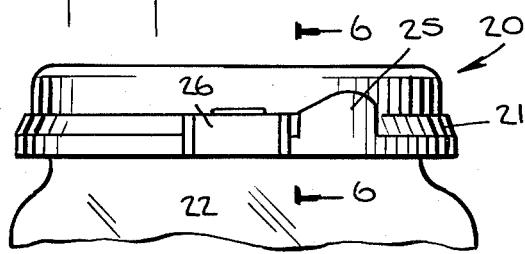
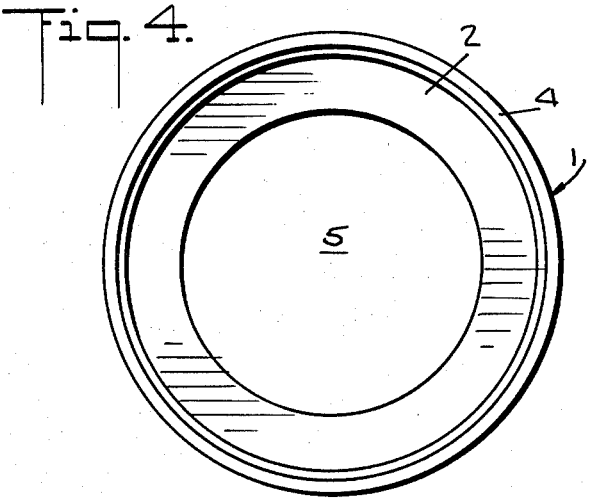
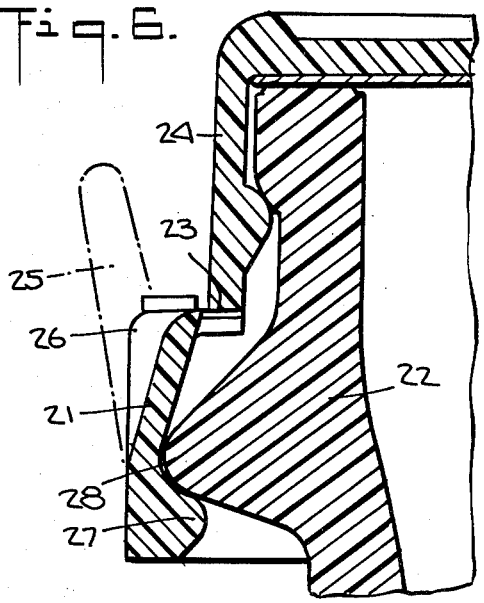

CLOSURE CAP WITH METALLIC INNERSEAL AND SEALED PACKAGE

BACKGROUND OF THE INVENTION

The present invention relates to a closure cap and a sealed package and more particularly to an improved closure cap having a metallic innerseal where the innerseal is initially attached to the container rim by an induction sealing operation.

The closure cap of the present invention is of the type where a hermetic seal is obtained by including a membrane or foil innerseal within the cap shell and where the innerseal is attached to the container rim to form the hermetic seal. The preferred attachment is made by using heat sensitive adhesive on the innerseal and by heating the innerseal using radio frequency induction heating while downward pressure is applied to the closure cap. Where the container is glass, the foil engaging surface of the container may have a bond enhancing coating such as a relatively thick tin oxide coating or other applied coating.

Packages are well known which utilize one form or another of an innerseal to provide an hermetic seal. In the sealing operations utilizing these innerseals, the innerseals are applied to the container along with the closure cap and the innerseal is fastened to the container utilizing adhesives. When the closure cap is removed, the innerseal remains on the container until it is removed or punctured by the package user.

The closure cap of the present invention differs from these prior closure caps by being particularly adapted for use with an aluminum or other current conducting innerseal and more particularly where the innerseal attachment is made using radio frequency induction heating. Additionally, a tin oxide or other coating is used on a glass container finish for improving the adhesion of the innerseal and also for contributing to the efficiency of the R.F. induction sealing operation. No coating is required where the cap is used on plastic containers. The closure cap facilitates both the initial induction sealing and also provides a substantially airtight reseal after the package has been opened and when the consumer wishes to reseal it.

These improved results are provided by the combination of a molded plastic cap having a container gripping or strapping action at the corner of the cap and additionally by having a relatively thin and somewhat flexible cap top and skirt for facilitating the induction heating of the innerseal. The container has a cooperating wide sealing area on its rim and also a rim of minimal wall thickness.

Accordingly, an object of the present invention is to provide improved induction sealed package.

Another object of the present invention is to provide an improved closure.

Another object of the present invention is to provide an improved plastic or glass package sealed with a metallic innerseal.

Another object of the present invention is to provide an improved closure for sealing a tin oxide coated container with an induction heated metallic foil.

Another object of the present invention is to provide an improved sealed package utilizing a combination of a tin oxide coated container with a molded plastic closure having a metallic innerseal.

Other and further objects of the present invention will by obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a perspective view of a preferred embodiment of a package sealed with a closure cap in accordance with the invention.

FIG. 2 is an enlarged vertical sectional view of the container and closure taken along line 2—2 on FIG. 1.

FIG. 3 is a vertical sectional view corresponding to FIG. 2 during the sealing.

FIG. 4 is a top plan view of the package in accordance with the invention.

FIG. 5 is a side elevational view of another embodiment of a closure cap in accordance with the present invention including a tamperproofing band.

FIG. 6 is an enlarged vertical sectional view of a closure cap and container taken along line 6—6 on FIG. 5.

DESCRIPTION OF THE PREFERRED EMBODIMENT

Described generally, the closure cap 1 of the present invention includes a molded plastic cap shell 2 containing a metallic sealing membrane or innerseal such as an aluminum innerseal 3. The innerseal 3 is cut and is positioned within the cap shell 2 for application to the container 4 during the sealing operation which will be further described below.

The molded plastic cap shell 2 includes a cover portion 5 having a raised stacking ring 6 and a depending skirt 7 including a container engaging head 8 projecting from the inner surface of the cap skirt 7. The container rim, as illustrated in FIGS. 2 and 3 has a relatively wide top sealing surface 9 which slopes downwardly to a finish radius 10 which merges into a tapered side finish 11. The tapered side finish 11 terminates in an inwardly rounded portion to provide a closure engaging bead 12.

During the container sealing operation, the cap 1 with the aluminum innerseal 3 contained within it is first pressed onto the container 4. Thereafter, downward pressure is applied to the closure 1 at the stacking ring 6 causing the plastic cap corner 13 to bend inwardly together with the underlying innerseal 3 so that they closely conform to the container finish 9, finish radius 10 and the top of side finish 11 as illustrated in FIG. 3. The lower container engaging surface of the innerseal 3 is coated with a heat softened adhesive 14 such as Surlyn or another heat sensitive adhesive. As downward pressure is applied to the closure cap 1, a radio frequency induction heating coil 15 is positioned immediately adjacent to the outer edge of the cap 1 and the closure cap corner 13 to generate heating currents in the aluminum innerseal 3. This current raises the temperature of the innerseal 3 and the adhesive 14 so that it melts or softens for attachment to the glass finish 9, 10 and 11.

A suitable radio frequency may be about two megacycles per second for a relatively brief time period of about 2 seconds. Improved results have been obtained by applying an oxide coating such as a tin oxide coating to the finish portions 9, 10 and 11 of the glass container. This oxide coating on a glass container provides an improved adhesion between the adhesive coated innerseal 3 and the container finish 9 and 10. Preferably the tin oxide coating is relatively thick and may be two to three times the thickness as previously employed for such coatings where the coatings were employed for protection and not in an induction sealing operation as described above.

The closure cap 1, as illustrated, has a relatively thin circular cover portion 5 and a correspondingly thin and generally cylindrical skirt portion 7 which join together at the corner 13. Suitable plastics for the molded cap shell 2 are low density polyethylene or polypropylene. These materials when molded with the relative thickness as shown in the illustrations, in other words with a thickness of about one to two milimeters, are readily deformable when a reasonable downward pressure is applied during sealing. This result is obtained, as illustrated in FIG. 3, during the induction sealing operation as downward pressure is applied to the closure covers at the stacking ring 6. The application of the pressure at the outer edge of the closure cap 1 immediately above the glass or plastic container sealing surfaces 9 and 10 causes the cap shell 2 and the underlying innerseal 3 to conform to the container finish including the sharply rounded finish radius 10. This is a rolling action which wraps the outer edge of the innerseal 3 around the finish radius 10 and the tapered side finish 11 during the sealing operation and provides a tight hermetic attachment between the innerseal 3 and the container 4. In addition, to the heating and softening of the adhesive 14 on the under surface of the innerseal 3, the heat within the closure shell 2 generated by the innerseal 3 also causes a slight melting or softening of the corner portion 13 of the closure shell 2 at and near container finish radius 10 and the side finish 11 so that both the innerseal 3 and the closure shell 2 closely conform to portions of the container finish The inwardly directed bead 8 on the closure skirt 7 engages the facing surface of the bead 12 on the container finish. Preferably, the plastic closure cap shell 2 is dimensioned to obtain a strapping or stretching action between the bead 8 and the cap cover 5 at the upper finish surface 9 of the container 4. This strapping action occurs at the opposite ends of the diagonal line A for the closure positions of both FIGS. 2 and 3. The strapping action is doubly useful as it operates during the initial sealing operation in combination with the sealing pressure to insure a firm attachment of the innerseal 3 and as it also functions to provide a positive or snap-type airtight resealing action after the closure 1 has been initially removed. The location of the closure bead 8 on the skirt 7 well up toward the closure cover 2 and the freely extending lower portion 16 of the closure skirt 7 eliminates any undesirable strapping action by the lower portion of the cap skirt 7 which otherwise would interfere with closure cap removal.

Additionally, the positioning of the cap bead 8 near the cover 5 assists in retaining the innerseal 3 within the cap shell 2 before the closure cap 1 is first applied.

FIGS. 5 and 6 illustrate a generally similar closure cap 20 which includes a tamperproofing feature in the form of a tamperproofing band 21 which must be removed in order to thumb or pry the closure cap 20 from the container 22. The tamperproofing band 21 is molded as an integral portion of the closure cap 20 with a frangible bridge or thin connecting means 23 being provided between the top of the band 21 and the lower edge of the cap skirt 24. The tamperproofing band 21 preferably includes a tear tab 25 for facilitating its removal and a thumb tab 26 hingedly connected to the skirt 24 may be positioned between ends of the band 21 as illustrated in FIG. 5. A locking bead 27 on the bottom of the band 21 engages a cooperating locking bead 28 on the container 22.

The plastic cap shell 29 above the band 21 is similar to the cap shell 2 already described for the embodiment illustrated in FIGS. 1 through 4.

It will be seen that an improved closure cap and sealed package have been provided which are particularly useful for an innerseal-type package and more particularly for one used with R.F. induction heat sealing using a metallic innerseal membrane. The shaping of the cap and the cooperating shaping of the plastic or glass container finish cooperate to provide the improved results described above. The result is a plastic closure cap of the innerseal-type which is easily and rapidly applied and which has an hermetic seal. When used on glass containers, the cap is particularly useful where the containers include bond enhancing coatings.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus disclosed our invention, we claim:

1. A closure cap for sealing a container having a sealing finish including a rounded corner and a closure retaining bead at its rim comprising a molded plastic shell with a cover and a depending skirt, a stacking ring at the outer edge of said cover, a retaining bead on the inside of said skirt, a metallic innerseal positioned within said plastic shell at the underside of said cover, said cover and said skirt being relatively thin and readily deformable under pressure, said retaining bead on said closure skirt being on the upper portion of said skirt for engaging the container bead, said innerseal extending into the corner between said closure cover and said skirt for wrapping around the container finish corner and the distance between said closure cap retaining bead and a portion of the closure cap cover above the inner edge of the container rim being proportioned to stretch the closure cap plastic at the corner between the closure cap cover and skirt for locking the cap onto the container.

2. The closure cap as claimed in claim 1 in which said cap shell is formed of relatively soft plastic for being temporarily deformable under pressure.

3. The closure cap as claimed in claim 1 in which said plastic is low density polyethylene.

4. The closure cap as claimed in claim 1 in which said plastic is polypropylene.

5. A sealed package comprising the combination of a container having a closure engaging bead at its rim, and
a molded plastic closure cap with a cover and depending skirt sealing said container and comprising the combination of,
a relatively flexible molded unitary cap shell with cover and skirt portions meeting at a corner portion,
a metallic innerseal positioned in said closure having its outer edge extending into said shell corner portion and being adhered to the container rim, said cap shell being deformed into a close sealing engagement with the container rim, a container engaging bead on the cap shell skirt, and the distance between container engaging bead on said cap shell skirt and a portion of the closure cap cover above the inner edge of the container rim being proportioned to stretch the closure cap plastic at the corner between the closure cap cover and skirt for locking the cap onto the container.

6. The package as claimed in claim 5 in which the container is glass and has a bond enhancing coating on its rim.

7. The package as claimed in claim 6 in which the coating is tin oxide.

8. The package as claimed in claim 5 which further comprises a downwardly and outwardly tapered side finish on the container rim extending downwardly from the rim finish corner.

9. The package as claimed in claim 5 in which the container engaging bead on the cap shell is positioned near the upper portion of the cap skirt.

10. The package as claimed in claim 5 which further comprises a stacking ring on the edge of said closure cap cover positioned above said container rim.

11. The package as claimed in claim 10 in which said stacking ring is positioned above only an outer portion of the container rim.

12. The package as claimed in claim 5 in which the container rim has a sealing finish comprising a top portion which slopes generally outwardly and downwardly to a rounded corner portion which curves sharply into a flared and downwardly and outwardly extending side sealing portion.

13. The package as claimed in claim 12 in which said innerseal is adhered to portion of said top and corner and side finish portions of said container.

* * * * *